United States Patent

Hoopingarner et al.

[11] Patent Number: 5,698,153
[45] Date of Patent: Dec. 16, 1997

[54] METHOD OF PRESCORING FOAM BOARD

[75] Inventors: Neil L. Hoopingarner, Everett; Barry D. Matin, Maple Valley, both of Wash.

[73] Assignee: The Boeing Co., Seattle, Wash.

[21] Appl. No.: 468,693

[22] Filed: Jun. 6, 1995

Related U.S. Application Data

[62] Division of Ser. No. 235,594, Apr. 29, 1994, Pat. No. 5,589,016.

[51] Int. Cl.$^6$ .......................... B29C 43/26; B29C 59/02; B29C 59/04
[52] U.S. Cl. .......................... 264/293; 156/87; 156/209; 264/294; 264/296; 264/321
[58] Field of Search ...................... 156/87, 209; 264/293, 264/321, 294, 296

[56] References Cited

U.S. PATENT DOCUMENTS

| | | |
|---|---|---|
| 2,157,622 | 5/1939 | Neesen et al. . |
| 2,240,765 | 5/1941 | Dryer . |
| 2,946,713 | 7/1960 | Dusina, Jr. et al. ................ 264/321 X |
| 3,170,974 | 2/1965 | Jacobs ................... 264/321 X |
| 3,244,571 | 4/1966 | Weisman ................ 264/321 X |
| 3,328,505 | 6/1967 | Spencer ..................... 264/321 |
| 3,378,432 | 4/1968 | Spencer ................... 264/321 X |
| 3,471,354 | 10/1969 | Scofield ................. 264/321 X |
| 3,655,312 | 4/1972 | Erb et al. ................ 264/321 X |
| 3,703,422 | 11/1972 | Yoshino . |
| 3,741,851 | 6/1973 | Erb et al. ................ 264/321 X |
| 3,814,653 | 6/1974 | Heier . |
| 3,932,245 | 1/1976 | Erb et al. ................ 264/321 X |
| 3,977,406 | 8/1976 | Roth ....................... 264/321 X |
| 4,022,643 | 5/1977 | Clark ..................... 264/321 X |
| 4,076,867 | 2/1978 | Lewicki, Jr. et al. ........... 264/321 X |
| 4,105,738 | 8/1978 | Rohn ...................... 264/321 X |
| 4,201,818 | 5/1980 | Rohn . |
| 4,210,052 | 7/1980 | Fisher . |
| 4,217,157 | 8/1980 | Stoltze et al. . |
| 4,294,055 | 10/1981 | Andresen . |
| 4,300,978 | 11/1981 | Whitemore et al. . |
| 4,740,258 | 4/1988 | Breitscheidel .............. 156/209 |
| 4,846,917 | 7/1989 | Hartel et al. . |
| 4,879,152 | 11/1989 | Green . |
| 5,066,531 | 11/1991 | Legg et al. .............. 264/321 X |
| 5,242,651 | 9/1993 | Brayden et al. . |

FOREIGN PATENT DOCUMENTS

| | | |
|---|---|---|
| 1290234 | 10/1991 | Canada . |
| 0239057 | 9/1987 | European Pat. Off. . |
| 0361418 | 4/1990 | European Pat. Off. . |
| 1301300 | 12/1962 | France . |
| 2330535 | 6/1977 | France . |
| 57-15921 | 1/1982 | Japan . |
| 63-296934 | 12/1988 | Japan . |
| 33286 | 7/1934 | Netherlands . |
| 6917630 | 5/1971 | Netherlands . |
| 362521 | 7/1962 | Switzerland . |
| 380310 | 4/1932 | United Kingdom . |

*Primary Examiner*—Jeff H. Aftergut
*Attorney, Agent, or Firm*—Lawrence W. Nelson; J. Michael Neary

[57] ABSTRACT

A method of prescoring foam board for making composite panels includes impressing a pattern of ridges projecting from a surface of a die into at least one face surface of the foam board. The pattern of ridges on the die forms a pattern of indentations having three series of parallel linear indentations, each series being angularly offset from each series other by 60°. The ridges on the embossing die are pressed into the foam sufficiently deep that the the pattern of indentations impressed in the board surface after whatever springback occurs remain deep enough to enable volatiles generated in an interior zone of a panel to escape when drawn out by a vacuum pump when the foam board is heated under pressure between two face sheets of resin-preimpregnated fabric to form a composite panel.

2 Claims, 7 Drawing Sheets

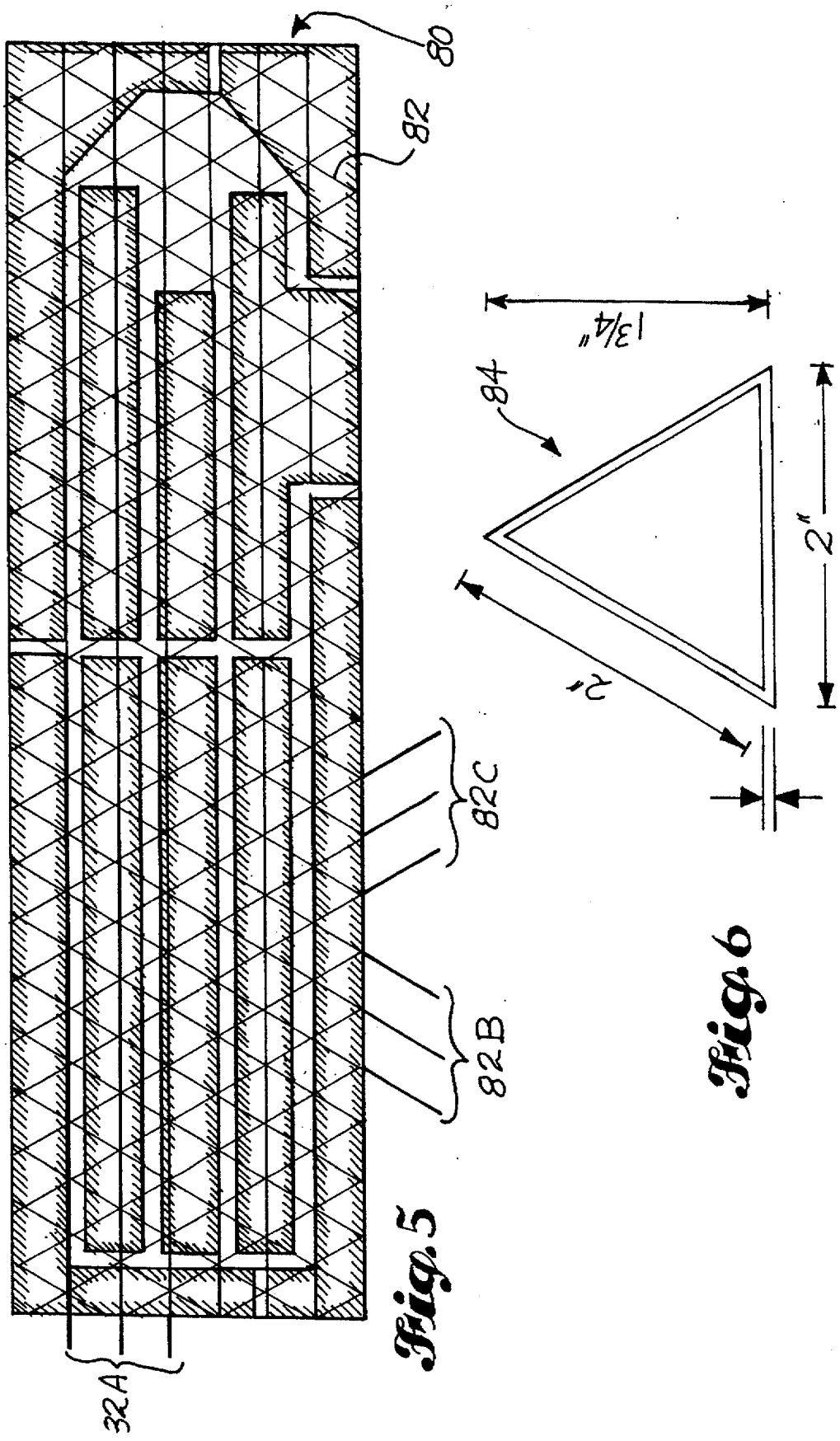

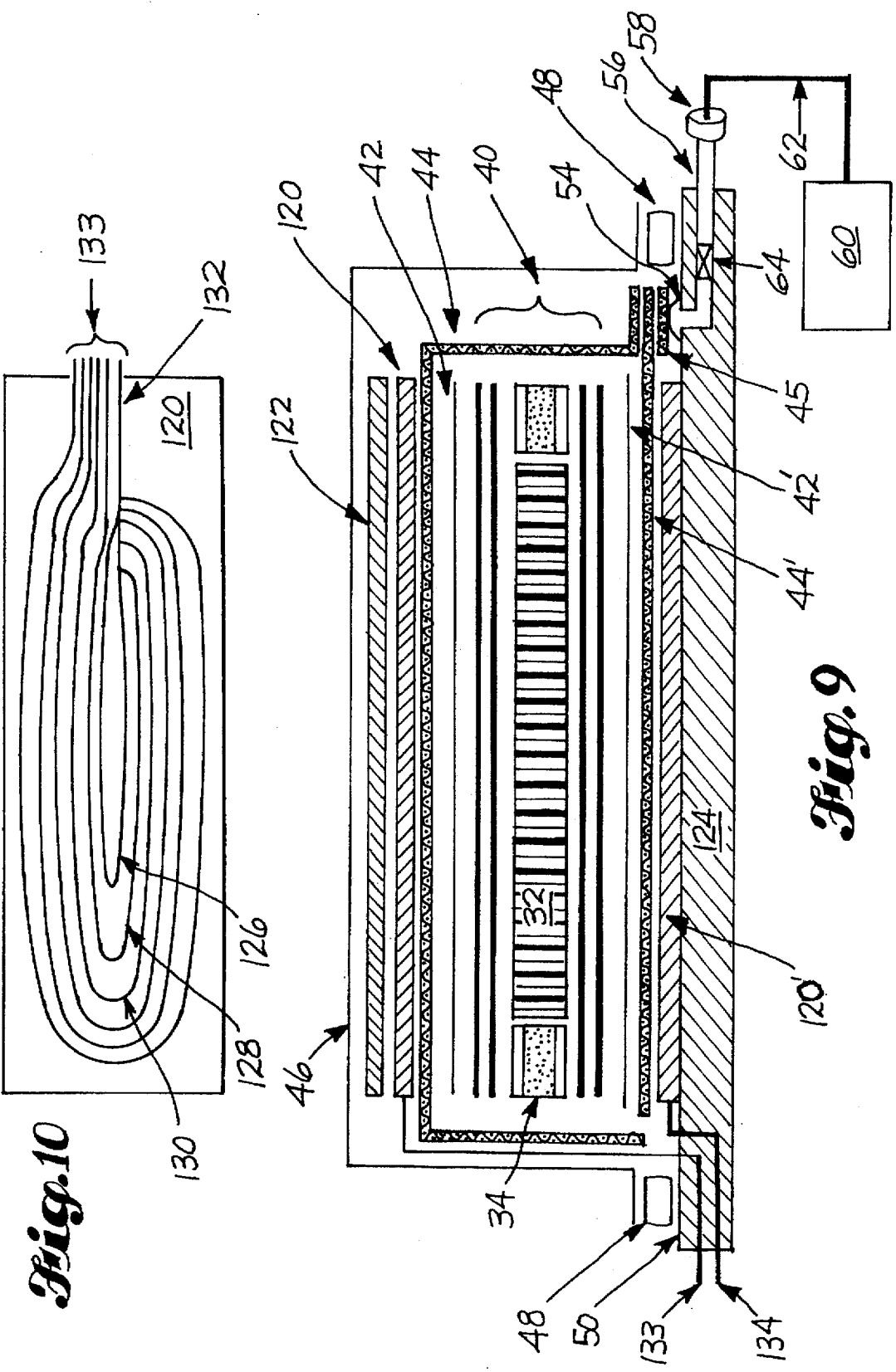

METHOD OF PRESCORING FOAM BOARD

This is a division of U.S. application Ser. No. 08/235,594 filed on Apr. 29, 1994, and entitled "Prescored Foam for Panel Fabrication", now U.S. Pat. No. 5,589,016.

This invention relates to a prescored foam board used in fabrication of composite panels, and more particularly to a method of manufacturing composite honeycomb core panels with a foam edge borders without manufacturing defects caused by outgasing from resin pre impregnated materials used for the face sheets of the panel.

BACKGROUND OF THE INVENTION

A modification of airplane interior panels to improve the flammability resistance of the panels involves a change of the resin chemistry used in the resin preimpregnated materials used to form the face sheets of the panels. A phenolic resin system provides the desired reduction in flammability, but also creates manufacturing problems because of the increased volume of volatiles produced during the curing of the resin. This increased volume of volatiles must be accommodated in the manufacturing process to prevent generation of excessive pressure within the interior of the panel which prevents bonding of the face sheets of the panel to the panel core materials.

The panels are made up from a honeycomb core surrounded by a foam border, all bonded rigidly together between a face sheet, made of one or more plies of resin preimpregnated fibrous material ("prepreg"), on each side of the panel. The elements that make up the panel are bonded together by the resin in the prepreg that forms the face sheets and the resin in the honeycomb core. The foam border is provided to give a clean uniform solid edge surface around the panel which the honeycomb material would not provide, allowing for sculpted or contoured edges.

Although the foam border performs its intended function as desired, it also tends to establish a barrier against egress of volatiles generated or otherwise present during the curing of the resin in the preimpregnated materials that form the face sheet and/or the honeycomb core during manufacturing. This is especially true when the panels are cured in an oven in which the heating of the panel to cure the resin in the preimpregnated face sheets tends to heat the panel first around its peripheral edges and on top, thereby flowing the resin at the peripheral edges first and establishing a seal between the face sheet and the foam border at a relatively early time in the cycle before all the volatiles in the other parts of the panel have been generated. Then, as the heating progresses and the interior and underside portions of the panel are heated in the oven, the resin cures, generating volatiles in the interior of the panel that can be trapped therein by the seal established earlier around the peripheral edge between the foam border and the face sheet.

One solution for the need to vent the interior of the panel during the generation of volatiles during curing of the resin is to score the foam border radially to provide gas channels leading from the interior of the panel to the outside edge of the foam border. This technique usually proved successful, but because of the variation in scoring depth and spacing between scoring marks, failures believed to be caused by excessive interior pressure within the panel during curing still occurred at an unacceptable rate. Also, a panel, appearing to have acceptable quality in the factory, would occasionally develop a delamination once at altitude because of the lower air pressure at altitude compared with the gas pressure within the sealed panel. Finally, the hand scoring technique was a very time consuming, costly, nonreproducable, and tedious task which the factory workers disliked. Moreover, when the hand scoring was done with a saw, it produced undesirable foam dust and created small cracks and tears in the foam which tended to act as stress risers, thereby lowering the strength that the foam edge border is expected to provide.

Accordingly, a need has existed for a prescored foam board material which can be used to make foam borders for composite panels, with an optimum scoring pattern which will provide gas flow channels from the interior of the panel to the exterior for venting of volatiles within the panel during fabrication. This pattern should be equally effective regardless of the angle at which the foam pieces are cut when the foam border is cut from the foam board stock. The scoring pattern should not weaken the foam board excessively. If possible the scoring of the gas channels in the foam surface should relax and at least partially fill in during the latter stages of manufacturing so that the panel interior can be sealed against intrusion of moisture or other contaminates during use in the airplane. Finally, the prescored foam should be no more expensive and preferably less expensive than the manual scoring method.

SUMMARY OF THE INVENTION

Accordingly, it is an object of this invention to provide an improved prescored foam board having a pattern of indentations that provides venting of volatiles generated within a composite panel during fabrication to prevent excessive gas pressure within the panel that could interfere with proper bonding of the panel elements during fabrication. Another object of the invention is to provide an improved method of making a composite panel using prescored foam borders to vent volatiles in the panel during curing of the resin used to make the panel. Still another object is to provide a method of making a prescored foam board to emboss an indentation pattern into the surface of the foam board used as a foam border on composite panels, which process preserves the strength of the board, avoids the generation of dust, and avoids creation of stress risers in the foam board which could affect its strength or service life. Yet another object of the invention is to provide a composite panel which is sealed around its periphery against intrusion of contaminates during use but which, during fabrication, had venting channels for escape of volatiles generated or otherwise present in the resin used in the materials used to make the composite panel. Still another object of the invention is to provide a method of prescoring foam board to produce gas channels for venting of volatiles generated within the core of the composite panel, which method is reliably effective in venting such volatiles and which also enables the channels to relax and facilitate sealing of the peripheral border of the panel against intrusion of contaminates.

These and other objects of the invention are attained in a prescored foam used in panel fabrication wherein the surface of the foam board has three series of parallel linear indentations, each of which lies at a angle 60° offset from the other two series and which are rolled, stamped sawn or otherwise impressed into the surface of the foam by a laser, ultrasonic knife, patterned roller, flat die, sawing system, or the like. A roller embossing system is preferred because it which ramps the indentations into the board without creating stress risers. During fabrication, the gases generated within the core of the panel are vented through the indentations in the surface of the foam board out to the exterior of the panel, preventing the generation of excessive gas pressure within the panel. A vacuum is drawn inside the panel to draw the face sheets tight against the honeycomb core for reliable bonding. During heating, the foam material relaxes and springs back to partially fill in the indentations, and resin from the pre impregnated material which will form the face sheets flows to completely fill the partial indentations to reseal the peripheral edge of the panel. Any volatiles remaining or generated after the edge of the panel is sealed by the flowing of resin from the face sheet material are accommodated by the vacuum previously drawn in the interior of the panel to pull the face sheets against the honeycomb core material.

DESCRIPTION OF THE DRAWINGS

The invention and its many attendant objects and advantages will become better understood upon reading the description of the preferred embodiment in conjunction with the following drawings, wherein:

FIG. 5 is a plan view of a foam board from which individual pieces are cut to form the foam edge frame for a composite panel;

FIG. 6 is a plan view of a typical cell dimension for the pattern of prescored indentations in the foam sheet shown in FIG. 5.

FIG. 9 is an exploded elevation, similar to FIG. 4, showing an alterative embodiment using electric heaters instead of an oven; and FIG. 10 is a schematic plan view of an electric heater for use in the assembly shown in FIG. 9.

DESCRIPTION OF THE PREFERRED EMBODIMENT

Figure 1:
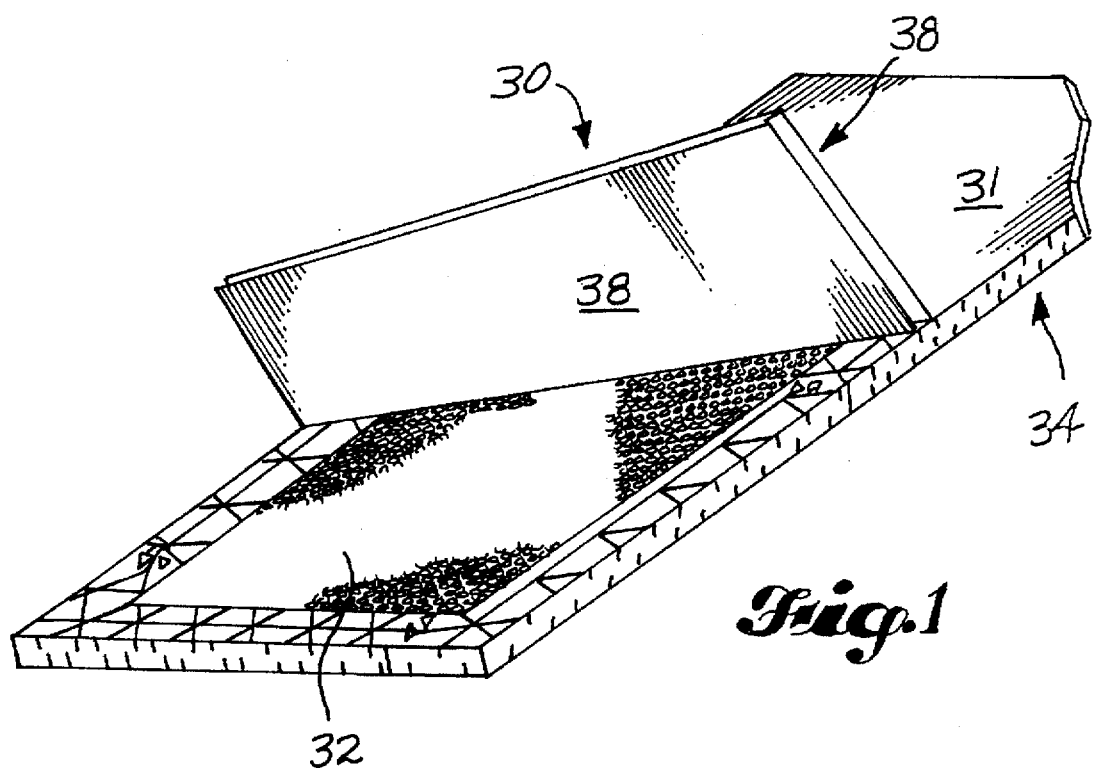
FIG. 1 is a perspective view of a panel with a top sheet pealed backshowing the two plies of the top sheet and revealing the interior honeycomb core material and the foam border edge showing the pattern of indentations formed in the surface of the foam board.
Figure 2:
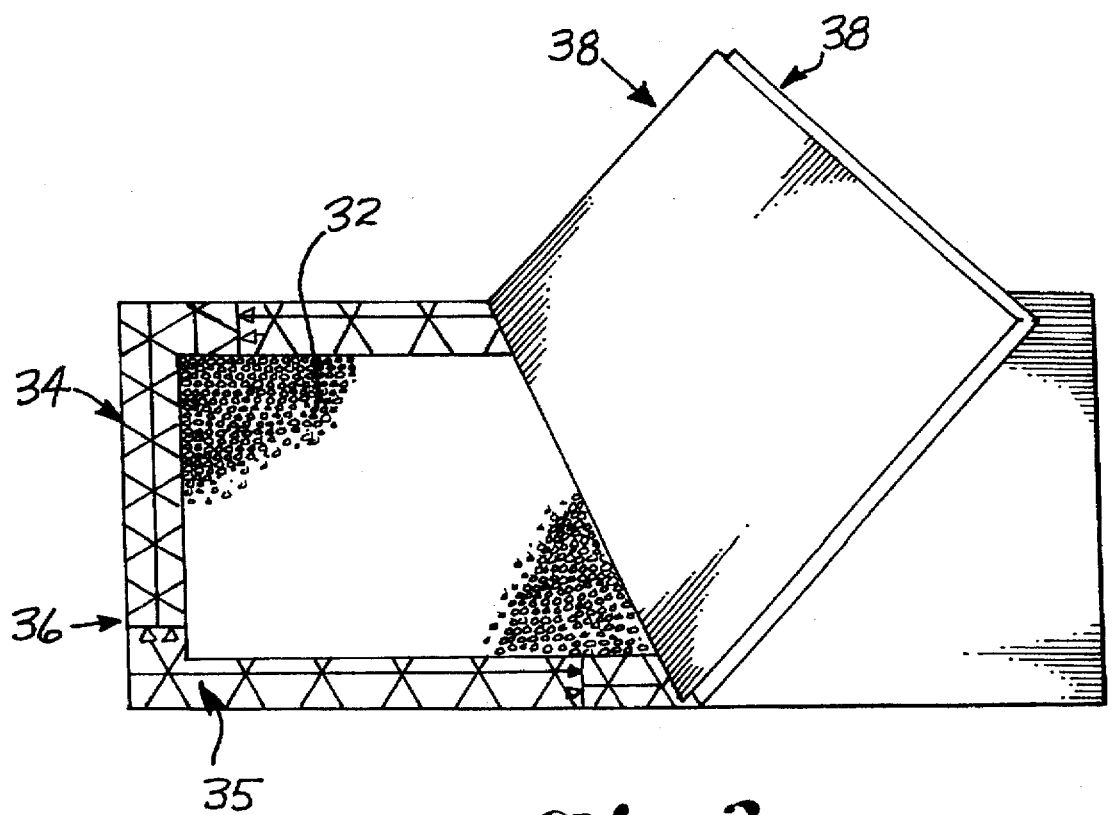
FIG. 2 is a plan view of the structure shown in FIG. 1.
Figure 3:
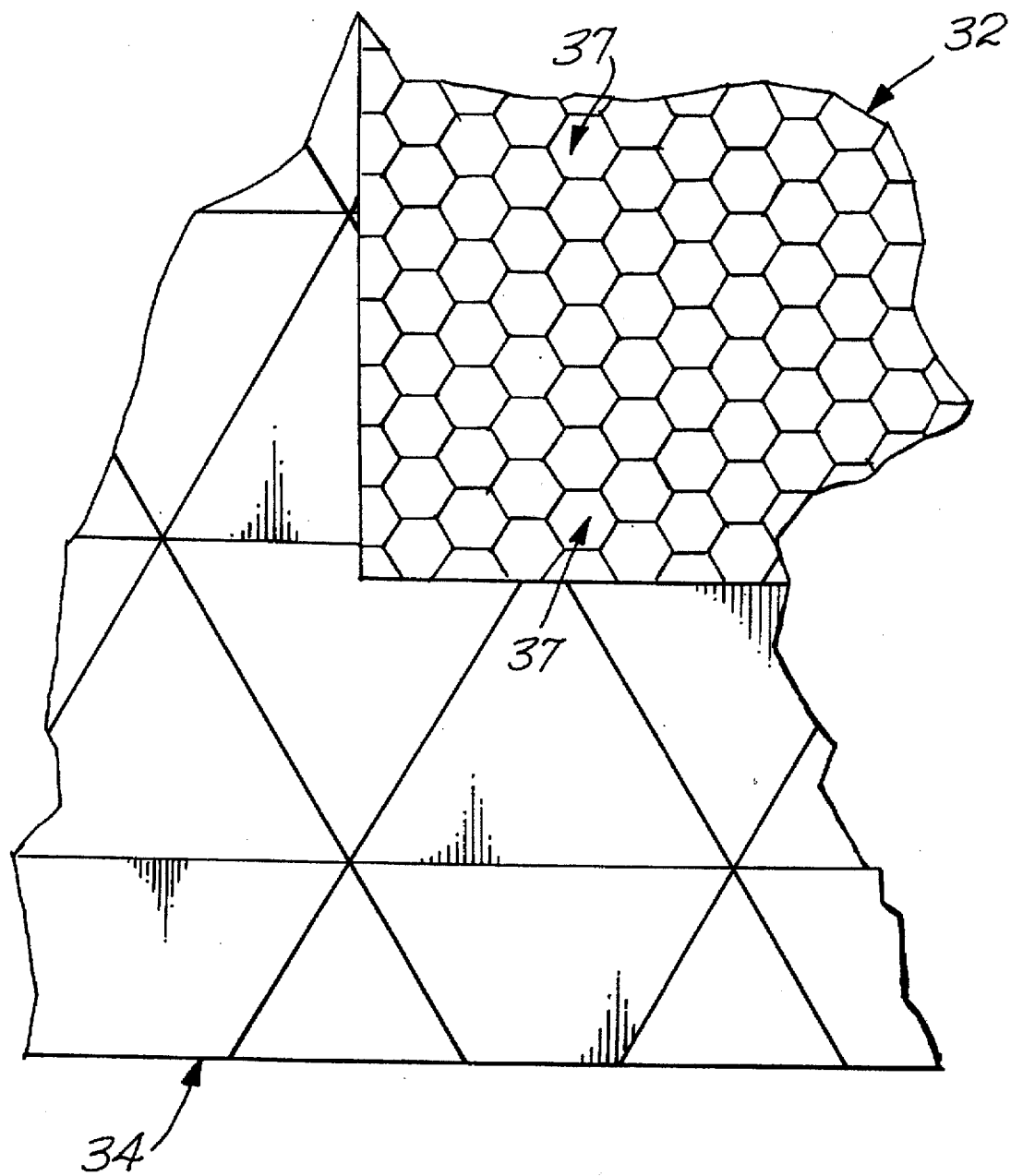
FIG. 3 is an enlarged plan view of a corner section of the honeycomb core element and a portion of the foam border edge shown in FIG. 2.

Turning now to the drawings, wherein like reference characters designate identical or corresponding parts, and more particularly to FIG. 1 thereof, a panel 30 is shown having a portion of a top sheet 31 pealed back to illustrate the interior construction of the panel. The panel 30 is made of interior components covered on both sides by face sheets 31. The interior components include a planar core element such as a honeycomb core element 32, and an edge border 34 of a closed cell foam such as polyurethane foam disposed around the honeycomb core element 32. The edge border element 34 can be made of a plurality of separate pieces 35 jointed and/or glued together at their junctions 36, as illustrated in FIG. 2, or can be a single piece cut from a large piece of foam board. Preferably, the foam edge border 34 is made up of a plurality of separate pieces 35 since the advantages of a single piece construction are outweighed by cost of the waste that would be caused by making the edge border 34 out of one piece without junctions 36. The separate pieces preferably include the corner instead of terminating at the corner, and are jointed together with a dovetail joint for strength and security against shifting apart during assembly and before bonding between the face sheets 31. The honeycomb core element 32 is made of phenolic resin, epoxy or other resin system preimpregnated Nomex paper formed into hexagonal cells 37 oriented with the cell axis perpendicular to the plane of the panel, as illustrated in FIG. 3. Alternatively, the honeycomb could be made with metallic foil or thermoplastic film.

Face sheets 31 are bonded on each side of the core element 32 and the surrounding edge border 34. The face sheets 31 are each made of one or more, preferably two, plies 38 of resin impregnated woven, braided, or unwoven fibrous material such as fiberglass fabric, Kevlar, graphite or the like material, commonly referred to as "prepreg", which are bonded together and bonded to the interior components with the impregnating resin in the prepreg. The resin selected for the use in the prepreg is phenolic resin, chosen for its physical characteristics, including flame retardance and resistance to flammability, light weight and low emission of noxious fumes in the presence of flame, as well as its mechanical properties of strength and stiffness. Prepregs using other polymer systems also suffer similar panel core pressure manufacturing problems and will benefit from this invention.

Figure 4:
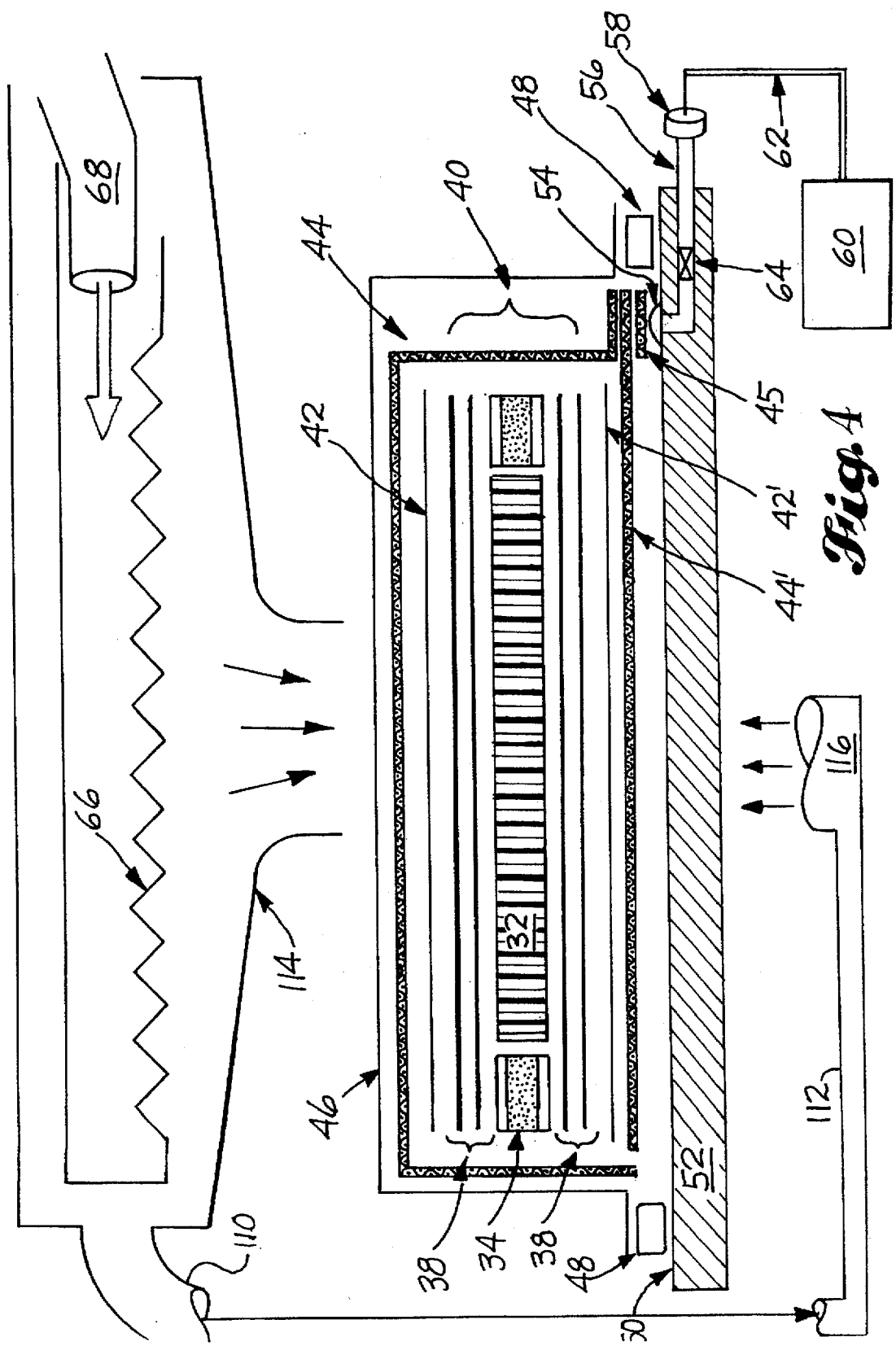
FIG. 4 is an exploded elevation of the elements that make up a panel shown in FIGS. 1 and 2, shown assembled in a vacuum bag for consolidation and bonding in an oven.

Although the phenolic resin has desirable physical properties, its use in the manufacture of the panel 30 has created manufacturing problems because of the large volume of volatiles which it generates during the curing process. In manufacturing the panel 30, the elements 40 which make up the final panel, namely the interior elements consisting of the honeycomb core element 32 and the surrounding foam edge border 34, and the two prepreg sheets 38 on each side of the interior elements, are assembled as illustrated in FIG. 4, between two sheets 42 and 42' of a release film, which assembly in turn is sandwiched between two sheets 44 and 44' of breather material. The entire assembly is then covered with a vacuum bag 46 of a heat resistant gas impervious material such as nylon for phenolic resin prepregs, PVC for epoxy prepregs or a silicon blanket sealed to a top surface 50 of a table 52 with a conventional sealing material 48. A series of vacuum ports 54 communicates through a strip 45 of breather material, which connects all the ports 54, with the surface of the table 52 by way of a gas pipe 56 and is connected by a coupling 58 to a source of vacuum such as a vacuum pump 60 through a vacuum line 62.

In operation, the assembly shown in FIG. 4 is sealed in the vacuum bag 46 to the top surface 50 of the table 52 by the seal material 48. The vacuum pump 60 is connected to the coupling 58 by way of the vacuum line 62 and air is evacuated from within the sealed enclosure within the vacuum bag 46. The withdrawal of air from within the vacuum bag 46 has the dual advantage of causing atmospheric air pressure exerted on the top surface of the bag 46 to press downward on the assembled elements within the bag, exerting a downward pressure on the top plies 38 pressing them against the core elements 32 and 34 and pressing those against the bottom plies 38'. This pressure will be effective in promoting bonding of the elements 40 together when the assembly is heated in an oven to flow the resin in the prepreg plies 38 and 38'. The second advantage of the vacuum in the bag 46 is that the air within the cells of the honeycomb element 32 is evacuated, establishing a low pressure reservoir which can accommodate the residual out gassing from the phenolic resin which may later be trapped by sealing of the panel elements around the peripheral edge, as described below.

After the vacuum has been established within the vacuum bag 46, the vacuum line is disconnected from the coupling 58, and the table 52 with the vacuum bag 46 and its assembled elements is transported into an oven along with numerous similar tables and assembled vacuum bags. The vacuum within the vacuum bag 46 is maintained by a one way valve 64 in the vacuum line 56, preventing intrusion of air back into the vacuum bag 46. In the oven, the coupling 58 is reconnected to another vacuum line 62 connected to the vacuum pump 60 to withdraw volatile gases generated or otherwise present during curing of the phenolic resin in the oven, and to maintain the consolidating pressure exerted by the atmosphere through the bag 46 on the plies 38 and 38'.

In the oven, power to resistance heating elements 66 is applied and air is circulated through a recirculating air supply line 68 to be heated by the elements 66 and circulate within the oven around the vacuum bag 46 to heat the bag and its contents and also heat the table 52. As the temperature rises, the resin preimpregnated in the prepreg sheets 38 and 38' begins to become less viscous and flows, wetting the prepreg sheets, the facing edges of the honeycomb core element 32, and the foam edge border 34. During this period, the phenolic resin in the prepreg sheets 38 produces significant volumes of volatiles, primarily water vapor, formaldehyde and free phenol which must have an escape path from the interior of what will become the panel when it is completely bonded together. Unless an escape path is provided for these volatiles, they will generate sufficient pressure within the core of the panel between the face sheets 31 and 31' to interfere with complete bonding of the sheets 38 and 38' to the honeycomb core element 32 and possibly the foam edge border pieces 34. For that purpose, a pattern of indentations shown in FIG. 5 is provided on the surface of the foam edge border pieces.

A foam board 80 of rigid polyurethane closed cell foam is shown in FIG. 5 having a pattern of surface indentations 82 embossed into the surface of the foam board 80. The pattern is in the form of three series of parallel lines all angularity offset from each other by 60°. A representative set of three lines from each series is illustrated in FIG. 5 as 82A, 82B and 82C. As illustrated, the linear indentations of series 82A in the board 80 extends parallel to the longitudinal axis of the board, and the two series 82B and 82C extend 60° from the series 82A to the right and to the left respectively. As illustrated, the linear indentations 82A, 82B and 82C all intersect at single points throughout the pattern, but the pattern could have been arranged with only two lines intersecting at any one point.

As shown in FIG. 6, the pattern of linear indentations 82 in the board 80 forms a series of contiguous equilateral triangles 84. For the size panel being constructed, a pattern in which the linear indentations are spaced about 1¾ inches apart produces an equilateral triangle having sides all equal to about 2 inches in length. This was found to produce a satisfactory series of venting channels for the volatile vapors generated inside the panel during curing of the phenolic resin. The width of the indentations is about 1/16th inch and the depth is about 1/16" to 3/16" deep. The dimensions could be adjusted to match the vacuum requirements of differing processes, constructions, or resin systems.

Figure 8:
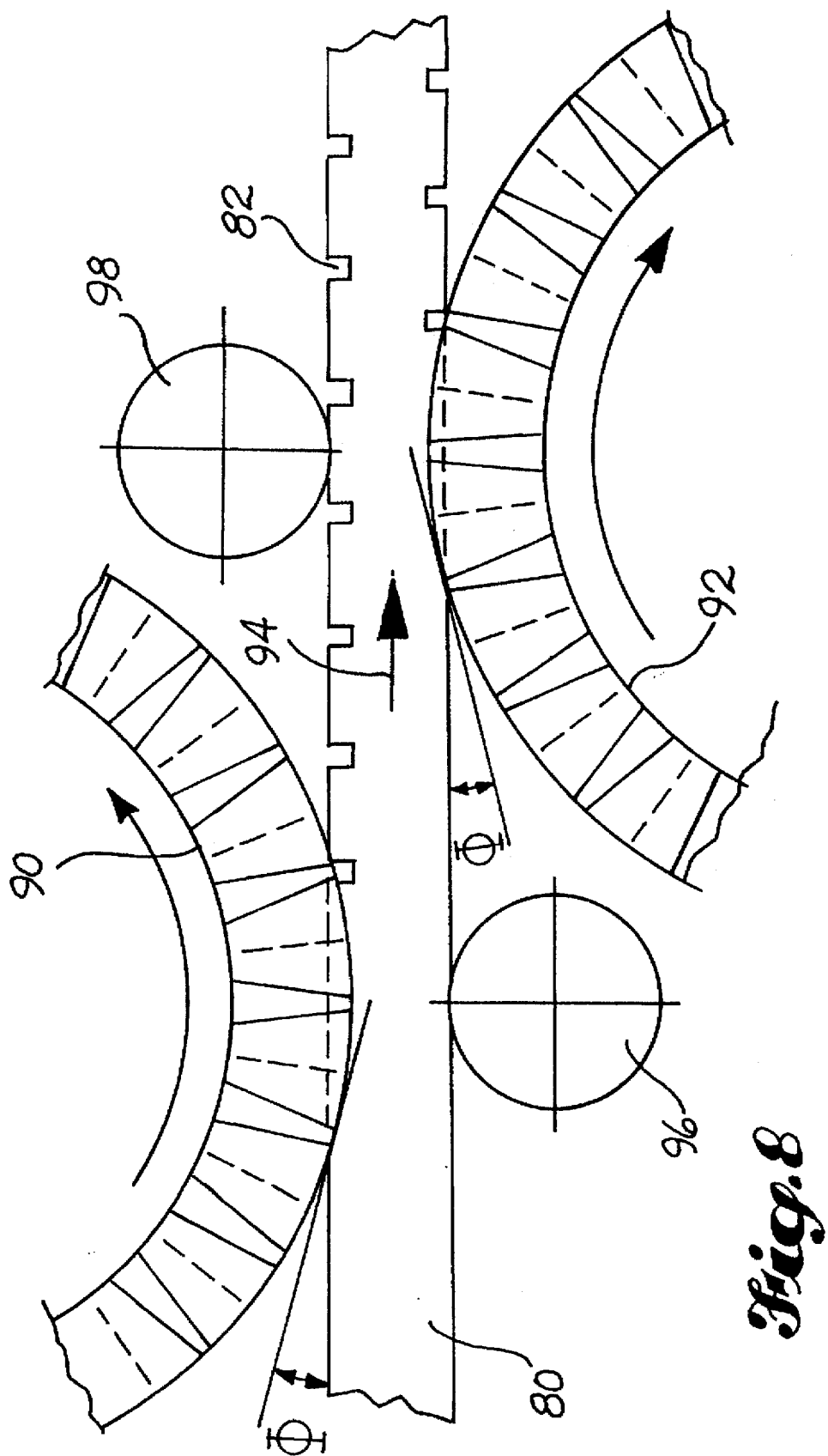
FIG. 8 is a schematic elevation of a roller mechanism for rolling the pattern of indentations shown in FIG. 5 into a rigid foam board.

The indentation pattern shown in FIG. 5 can be cut into the foam board using a saw with a depth gauge and automatic indexing of the board after each saw cut. Likewise, it could be formed by a series of die strokes using a flat or curved die having the pattern shown stamped into the board. These techniques produce adequate patterns of linear indentations, however they also produce foam dust in the case of sawing and small cracks or tears in the foam board in the case of sawing and stamping. In most cases, these problems will not significantly affect the manufacture or use of the panel, so they may be disregarded. However, in situations where they may be considered undesirable, a preferable technique may be used, as illustrated in FIG. 8, using two embossing rollers 90 and 92 having the die pattern shown in FIG. 8 set in their exterior surface. The two embossing rollers 90 and 92 are spaced longitudinally in the direction of motion of the board 80 indicated by the arrow 94. Preferably, each roller 90 and 92 has a solid idle roller 96 and 98, respectively, positioned on the opposite side of the board 80 to provide a reaction force to the force exerted by the embossing rollers 90 and 92. As illustrated, the pattern embossed into the top surface of the board 80 by the roller 90 is offset from the same pattern embossed in the lower surface of the board 80 by the roller 92 so that none of the embossed linear indentations coincide which could form a weak hinge point in the foam board 80.

Besides the advantages of speed and cleanliness provided by the rolling technique for embossing the pattern of indentations 82 into the foam board 80, the rolling technique also avoids the generation of small cracks and tears in the foam material which occur with the stamping and sawing technique and serve as stress risers which can form the start of fatigue cracks in the material. The avoidance of the stress risers is believed to occur because of the gradual ramping of the indentations into the material at a small ramp angle $\Phi$. This angle $\Phi$, about 10°–35°, preferably about 15°, allows the die surfaces in the rollers 90 and 92 to gradually displace the material in the surface of the foam board 80 and do so in localized areas of the foam board surface. This allows other material immediately upstream of the die contact area to prestrain and distribute the stress laterally, so when that area is strained by the rolling die it does not tend to result in the small tears and cracks that are observed with the use of a flat die.

Figure 7:
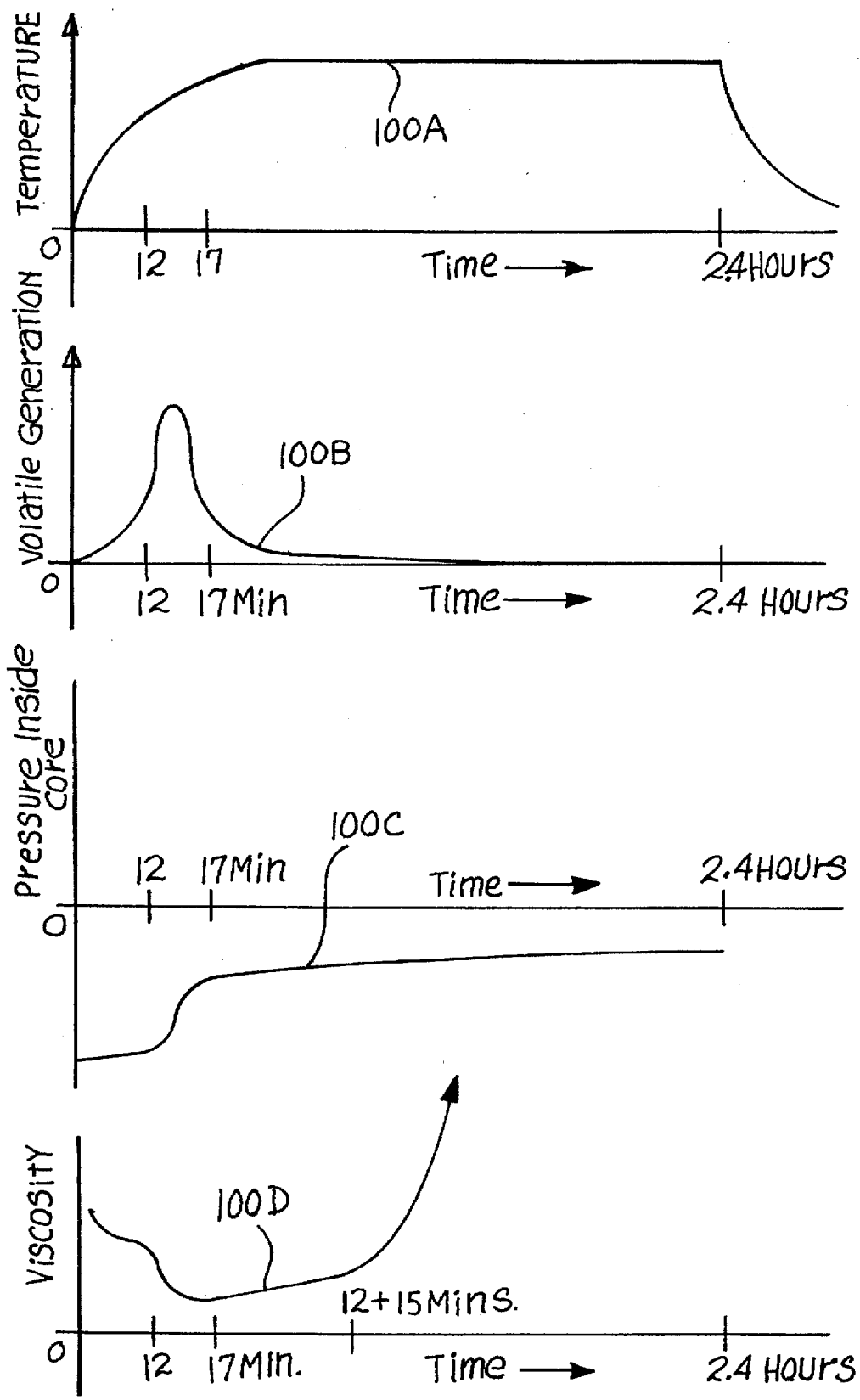
FIG. 7 is a graph showing the approximate timed sequence of various parameters related to the process for making the composite panel.

Turning now to FIG. 7, a graph is shown having time as the abscissa and various parameters of the process such as temperature, rate of volatile generation, core pressure, and resin viscosity as separate ordinates. The graph of FIG. 7 shows the change in these parameters as the cycle progresses from beginning to end. At time zero, all of the tables 52 have been loaded into the oven, the vacuum lines 62 connected to all of the couplings 58, oven door closed and the heater elements 66 energized. The temperature begins to climb and reaches a temperature of about 200° F. in about 12 minutes. At about this temperature, the resin reaches gelling temperature, its viscosity falls, and the resin flows, wetting the surfaces in contact with the prepreg materials. Also at this temperature, the evolution rate of volatiles increases rapidly. Volatiles, primarily water vapor, are generated rapidly and continue to be generated for the next 5 or so minutes. At this phase in the cycle, the cross linking of polymers in the phenolic resin matrix accelerates. As the cross linking proceeds the resin viscosity increases and it becomes more difficult for volatiles generated in the core of the panel to escape through the embossed indentations in the surface of the foam edge border 34. Eventually, the resin will become viscous enough to prevent further escape of volatiles generated within the core of the panel and the vacuum established by the vacuum pump 60 in the core of the panel will begin absorbing these volatiles. The residual generation of volatiles in the core after the prepreg face sheets 31 bond to the foam edge border to seal the peripheral edge of the panel results in a decrease of the vacuum, or increase in pressure, in the core, as shown in the graph 100° C.

Since the natural heat flow into an article lying on the table 52 in the oven is from the top and sides of the heated article inward, the top surface and peripheral edges of the panel elements shown in FIG. 2 will tend to be heated first. The center of the panel on the table side tends to reach gelling temperature last. This situation could potentially cause the peripheral edge of the panel elements to be heated to gelling temperature and begin cross linking before the evolution of volatiles in the lower central portion of the panel has commenced. In such a situation, especially in the fabrication of very large panels, this could potentially result in premature sealing of the peripheral edge of the panels before evolution of the volatiles from the ungelled resin, and the development of excessive pressure in the core of situation, a refinement of th a situation, a refinement of the heat application can be used to tailor the sequence of gelling in zones of the panel to prevent premature sealing of the panel periphery and enhance the efficacy of the scoring pattern in the foam edge boarder.

To alter the pattern of heating in the oven to heat from the center outward rather than from the peripheral edge inward, as shown in FIG. 4, a pair of heat ducts 110 and 112 is provided above and below each table 52 having suitable gas respective nozzle 114 and 116 disposed over the center of the area in which the panel will be positioned. The nozzles 114 and 116 will direct the heated air in the convection oven against the top and bottom center of the vacuum bag 46 and the table 52 respectively causing the center of the bag assembly and table to heat up first. This arrangement will cause the gelling of the resin in the prepreg sheets 38 and 38' to occur first in the center, thereby leaving open a path for egress of the ensuing volatiles before the peripheral edge of the part becomes sealed when the resin at the peripheral of the part gells.

The same zone controlled heating illustrated by the use of the ducts 110 and 112 in FIG. 4 is also achieved in a second embodiment of the invention as shown in FIG. 9, wherein a pair of electrical heaters a top heater element 120, and a lower heater element, shown in FIG. 9, are respectively disposed above and below the same elements 40 through 44 shown in FIG. 4. An insulator 122 is placed over the top of the top heater element 120 and the entire arrangement is sealed in a vacuum bag 46 to a table 124 by a sticky sealant 48.

The heater 120 is a flexible blanket heater having a series of heater elements 126, 128, 130 etc. disposed concentrically around the center heater element 126, as shown in FIG. 10. Lead wires connect from the peripheral edge of the blanket heater 120 to each of the heater elements and each element is connected to a common ground 132. The lower heater element 120' can be set into the table 124 with internal leads 134 or can be a separate heater element lying on the surface of the table 124.

In operation, the elements 40 through 44 are assembled on the heater element 120' and covered with the heater element 120 and the insulation blanket 122. The vacuum bag 46 is placed over the assembly and sealed to the table 124 with a sealant 48. The vacuum pipe 56 is connected by its coupling 58 to a vacuum line leading to a source of vacuum 60, and a vacuum is drawn inside the vacuum bag 46. After the vacuum is established and the atmospheric pressure is exerting a uniform downward force on the top of the bag 46 to compress all of the elements 40 that will form the panel, the center element 126 in the top and bottom heaters 120 and 120' is energized to begin heating the center of the assembly. After a suitable interval of about 5 minutes, the next concentric radial heater 128 adjacent to the inner heater 126 is energized to begin heating the next radial zone outside the center zone 126. The heating of the panel elements progresses radially outwardly in this manner. As the gelling and curing of the resin progresses from the center outward, the volatiles generated during the gelling and curing process can escape radially outward through the linear indentations 82 in the foam edge board pieces 34 since the resin at the peripheral edges of the panel has not yet begun to gell and fill the indentations 82. The elements 128, 130 et cetera are energized in a sequence that provides a suitable time period for the generation of the volatiles to progress through its normal maximum generation rate and begin tapering off before the next element raises the temperature to cause the generation of volatiles in the next radially outward zone to peak, so that all of the volatiles can be drawn out from the interior of the panel thorough the vacuum pipe system 56 before the peripheral edge around the foam edge border 34 is heated and sealed.

Obviously, numerous modifications and variations of the described preferred embodiments will occur to those skilled in the art in view of this disclosure. Accordingly, it is expressly to be understood that these modifications and variations, and the equivalents thereof, may be practiced while remaining within the spirit and scope of the invention as defined by the following claim, Wherein we claim:

1. A method for preparing a foam board used in composite panels, said method comprising the steps of:

impressing a first pattern of ridges of a first die onto a first surface of said foam board, said first pattern of ridges forming a first pattern of indentations having three series of parallel linear indentations, each series intersecting the other two series at a 60° angle, said impressing a first pattern including the steps of:
ramping said first die into said first surface at an angle of between 10° and 30° with the first surface; and
applying pressure to said first surface with said first die until said first pattern of indentations is deep enough to allow gaseous material to pass therebetween; and impressing a second pattern of ridges of a second die onto a second surface of said foam board, said second pattern of ridges forming a second pattern of indentations, which is offset from said first set of indentations, and having three series of parallel linear indentations each series intersecting the other two series at a 60° angle, said impressing a second pattern including the steps of:
ramping said second die into said second surface at an angle of between 10° and 30° with the second surface; and
applying pressure to said second surface with said second die until said second pattern of indentations is deep enough to allow gaseous material to pass therebetween.

2. The method for preparing a foam board according to claim 1, further including the step of:
cutting said foam board into a plurality of pieces, wherein at least one of the series of indentations of the first and second pattern of indentations intersects with each edge of the pieces.

* * * * *